United States Patent Office 3,840,519
Patented Oct. 8, 1974

3,840,519
2-HALO-4-NITROPHENYL-AZOPHENYL DISPERSE DYES
Rasso Hahn, Basel, Basel-Stadt, and Curt Mueller, Binningen, Basel-Land, Switzerland, assignors to Sandoz Ltd., Basel, Switzerland
No Drawing. Continuation of abandoned application Ser. No. 816,010, Apr. 14, 1969. This application Aug. 18, 1971, Ser. No. 172,901
Claims priority, application Switzerland, Apr. 25, 1968, 6,193/68
Int. Cl. C09b 29/08
U.S. Cl. 260—207.1
12 Claims

ABSTRACT OF THE DISCLOSURE

Compounds of the formula

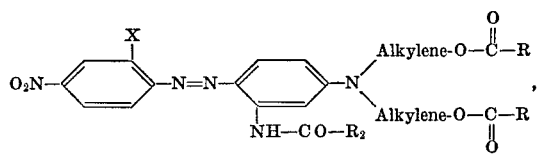

wherein R is phenyl, benzyl or phenoxymethyl, or a substituted derivative thereof,
$R_2$ is alkyl or alkoxy, and
X is chloro or bromo, dye fibres consisting of hydrophobic organic substances of high molecular weight and materials made of these fibres. From aqueous dispersion the dyes build up excellently on these fibres. Resulting dyeings are fast to light, washing, perspiration, rubbing, alkali, gas fumes, ozone and sea water.

---

This application is a continuation of Ser. No. 816,010, filed on Apr. 14, 1969, and now abandoned.

This invention relates to dyes of the 2-halogeno-4-nitro-2'-acylamino-4'-(dialkyl)-amino - 1,1' - azobenzene series which are highly suitable for dyeing fibres consisting of hydrophobic organic substances of high molecular weight and to material made of these fibres. The new dyes are of the formula

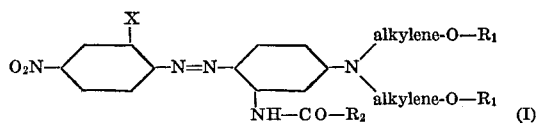

where X stands for a chlorine or bromine atom, $R_1$ for a benzoyl, benzylcarbonyl or phenoxyacetyl group which may bear non-water-solubilizing substituents and $R_2$ for an alkyl or alkoxy group. The term "non-water-solubilizing substituents" refers to all the substituents commonly present in dyes with the exception of carboxylic acid and sulphonic acid groups.

In the preferred dyes the phenyl radicals of the substituent $R_1$ are unsubstituted or substituted by halogen atoms, in particular fluorine, chlorine or bromine atoms, alkyl, alkoxy or nitro groups.

All the alkyl, alkoxy and alkylene radicals in the new dyes contain preferably 1, 2, 3 or 4 carbon atoms.

The dyes are produced either by diazotization of an amine of the formula

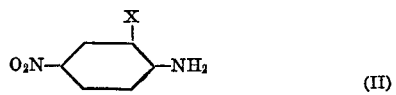

and coupling of the resulting diazonium compound with a compound of the formula

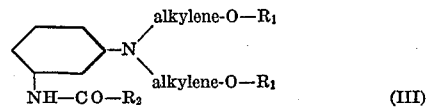

or by acylation or 1 mole of an azo compound of the formula

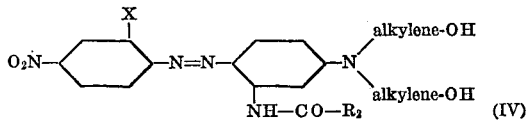

with 2 moles of an acid of the formula $$R_1\text{—OH} \quad (V)$$

or preferably of suitable functional derivatives thereof, e.g. the anhydride or halides, in particular the chloride.

The coupling reaction generally takes place in acid medium with cooling; the medium may be buffered if necessary, sodium acetate being a particularly suitable buffering agent.

The reaction of azo compounds of formula (IV) with acids of formula (V), or their derivatives can be effected in an inert organic solvent, e.g. dioxane, nitrobenzene, xylene, toluene or a chlorobenzene, or in a excess of the compound (V), which then serves simultaneously as solvent, at temperatures ranging from about 10° to 40° C. It can be of advantage to react in the presence of an acid binding agent, e.g. magnesium oxide or an alkali carbonate or bicarbonate.

The dyes of formula (I) can be worked up into dye preparations by a known methods, e.g. by grinding in the presence of dispersing agents and/or fillers, with subsequent vacuum or injection drying. After the addition of a suitable volume of water the dye preparations can be applied to the fibre by exhaustion dyeing, pad dyeing or printing processes at a long or short liquor to goods ratio.

From aqueous dispersion the dyes build up excellently on textile fibres consisting of synthetic and semi-synthetic high-molecular organic substances of hydrophobic character. They are highly suitable for dyeing and printing textiles of polyester, cellulose diacetate, cellulose triacetate and polyamide fibres.

The known dyeing and printing methods are employed for their application, e.g. that described in French Pat. 1,445,371.

The dyeing obtained are of red shade and have very good all-round fastness, with particularly good fastness to light, washing, perspiration, rubbing, alkali, gas fumes, ozone and sea water. They are stable to heat treatments, including thermofixation and pleating, at temperatures up to 180° C. without sublimation, and show similarly good reduction stability. The wool reserve and the dischargeability are good. The dyes are stable to the action of soil release finishes and the precure and post-cure permanent press finishing processes.

In comparison with the dye of Example 25 of French Pat. 1,354,582, the next comparable dye of the present invention has better light and wash fastness on polyester fibres.

In the following examples the parts and percentages are by weight and the temperatures in degrees centigrade.

EXAMPLE 1

In the presence of hydrochloric acid 17.2 parts of 1-amino-2-chloro-4-nitrobenzene are diazotized with 7 parts of sodium nitrite in the normal manner. After the addition of 3 parts of urea the diazonium salt solution is filtered.

Coupling is effected at about 5° by adding to the filtered solution of the diazonium salt a solution of 46 parts of 1 - N,N-di-(β-benzoyloxyethyl)-amino-3-propionylaminobenzene in 50 parts of glacial acetic acid. The red dye thus formed is filtered off, washed with water until free of acid and dried. The 1-amino-2-chloro-4-nitrobenzene can be replaced by 1-amino-2-bromo-4-nitrobenzene, on which a similar dye is obtained.

EXAMPLE 2

17.2 parts of 1-amino-2-chloro-4-nitrobenzene are diazotized by the normal method with 7 parts of sodium nitrile in the presence of hydrochloric acid. 3 parts of urea are added to the diazonium salt solution which is then filtered. Coupling is effected at about 5° by adding to the filtered solution of the diazonium salt a solution of 25.2 parts of 1-N,N-di-(β-hydroxyethyl)-amino-3-propionylaminobenzene in 50 parts of glacial acetic acid. The product is isolated by filtration, washed with water until free of acid and dried. It is then dissolved in dioxan and this solution is mixed at room temperature with 31 parts of phenylacetic acid chloride in the presence of magnesium oxide and with stirring. After about 2 hours the red dye thus formed is filtered off, washed and dried.

Further red dyes of formula (I) which can be produced in accordance with the procedures of Examples 1 or 2 are specified in the table below.

DYEING EXAMPLES (A) A mixture of 7 parts of the dye of Example 1, 4 parts of sodium dinaphthylmethane sulphonate, 4 parts of sodium cetylsulphate and 5 parts of anhydrous sodium sulphate is ground in a ball mill for 48 hours to give a fine powder. One part of the powder is suspended in a small amount of water and the suspension run through a sieve into a bath of 4000 parts of water containing 2 parts of sodium laurylsulphate. The liquor to goods ratio is 40:1. 100 parts of a scoured fabric of polyester fibre are entered in the bath at 40–50°, after which 20 parts of an aqueous emulsion of a chlorinated benzene are added. The bath is raised slowly to 100° and the fabric dyed for 1–2 hours at 95–100°, after which time it is removed, rinsed, soaped, rinsed again and dried. A level red dyeing is obtained which is very fast to light, cross-dyeing, washing, water, sea water, perspiration, sublimation, gas fumes, thermofixation, pleating and permanent press finishing.

(B) A mixture of 30 parts of the dye of Example 2, 40 parts of sodium dinaphthylmethane disulphonate, 50 parts of sodium cetylsulphate and 50 parts of anhydrous sodium sulphate is ground in a ball mill to form a fine powder. A dyebath is prepared with 4 parts of this powder and 1000 parts of water at 40–50°. 100 parts of a scoured polyester fabric are entered into the bath and its tem-

TABLE

| Example number | Alkylene-O-R$_1$ | R$_2$ | X |
|---|---|---|---|
| 3 | —CH$_2$CH$_2$—O—CO—CH$_2$O—C$_6$H$_5$ | —C$_2$H$_5$ | Cl |
| 4 | —CH$_2$CH$_2$—O—CO—C$_6$H$_5$ | —OCH$_3$ | Cl |
| 5 | —CH$_2$CH$_2$—O—CO—CH$_2$—C$_6$H$_4$(Cl) | —C$_2$H$_5$ | Br |
| 6 | —CH$_2$CH$_2$—O—CO—CH$_2$—C$_6$H$_4$—NO$_2$ | —CH$_3$ | Br |
| 7 | —CH$_2$CH$_2$—O—CO—CH$_2$—O—C$_6$H$_4$(CH$_3$) | —OCH$_3$ | Br |
| 8 | —CH$_2$—CH(CH$_3$)—O—CO—C$_6$H$_5$ | —CH$_3$ | Cl |
| 9 | —CH$_2$CH$_2$—O—CO—CH$_2$—C$_6$H$_4$—OC$_2$H$_5$ | —C$_2$H$_5$ | Cl |
| 10 | —CH$_2$CH$_2$—O—CO—C$_6$H$_4$(Cl) | —C$_2$H$_5$ | Cl |
| 11 | —CH$_2$CH$_2$—O—CO—CH$_2$—C$_6$H$_5$ | —CH$_3$ | Cl |
| 12 | —CH$_2$CH$_2$—O—CO—C$_6$H$_4$—CH$_3$ | —C$_2$H$_5$ | Cl |
| 13 | —CH$_2$CH$_2$—O—CO—C$_6$H$_4$—Cl | —CH$_3$ | Br |
| 14 | —CH$_2$CH$_2$—O—CO—C$_6$H$_4$—F | —OCH$_3$ | Cl |
| 15 | —CH$_2$CH$_2$—O—CO—C$_6$H$_4$—Br | —OC$_2$H$_5$ | Cl |
| 16 | —CH$_2$CH$_2$—O—CO—CH$_2$—O—C$_6$H$_4$—F | —C$_2$H$_5$ | Br |
| 17 | —CH$_2$CH$_2$—O—CO—C$_6$H$_4$—OC$_3$H$_7$ | —C$_2$H$_5$ | Cl |
| 18 | —CH$_2$CH$_2$—O—CO—C$_6$H$_4$—C$_3$H$_7$ | —C$_2$H$_5$ | Cl |
| 19 | —CH$_2$—CH$_2$—O—CO—C$_6$H$_5$ | —OC$_2$H$_5$ | Cl |
| 20 | —CH$_2$—CH$_2$—O—CO—C$_6$H$_5$ | —OC$_3$H$_7$ | Br |
| 21 | —CH$_2$—CH$_2$—O—CO—C$_6$H$_5$ | —C$_3$H$_7$ | Br | perature is then increased slowly to 130°, on which dyeing is continued for about 1 hour under static pressure. On removal the fabric is rinsed, soaped, rinsed and dried. The dyeing is of red shade an has fastness properties comparable to those of the dyeing of Example A.

(C) A mixture of 20 parts of the dye of Example 1, 55 parts of powdered sulphite cellulose lye and 800 parts of water is ground in a ball mill until the size of the dye particles is less than 1 micron. The colloidal solution thus obtained is mixed with 25 parts of ethylene diglycol monobutylether and 400 parts of 6% carboxymethyl cellulose to give a printing paste which is highly suitable for the vigoureux printing of polyester tops. The tops are printed with two rollers giving a coverage of 78% and without intermediate drying are steamed at 120°. The red prints thus obtained have good fastness properties.

(D) A fine aqueous dispersion of 30 parts of the dye of Example 2, 70 parts of sodium dinaphthylmethane disulphonate and 3 parts of sodium alginate is prepared, and subsequently water is added with good stirring to give a total of 1000 parts of dye liquor. This dye liquor is padded on a polyester fabric at 20° and the fabric air dried at 60–100°, after which the dyeing is fixed by treatment for 1 minute in dry heat at 230°. Subsequently the fabric is rinsed, soaped, rinsed and dried. A fast, level red dyeing is obtained.

Formulae of representative dyes of the foregoing Examples are as follows:

Example 1

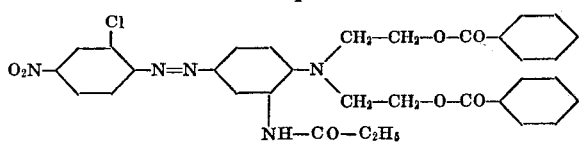

Example 2

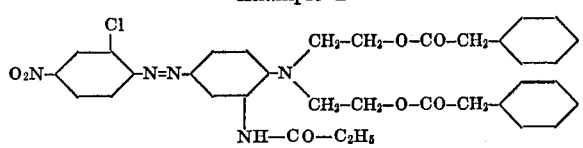

Example 3

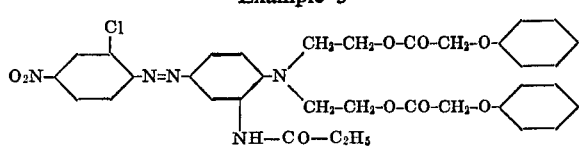

Example 4

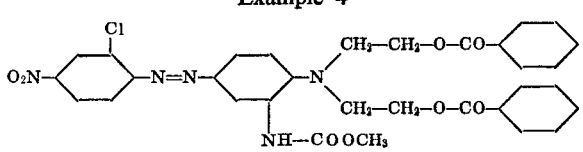

Example 6

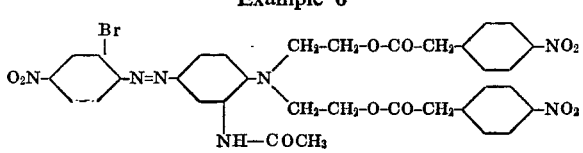

What is claimed is:

1. A compound of the formula

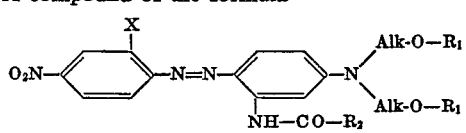

wherein each $R_1$ is benzoyl, substituted benzoyl, benzylcarbonyl, substituted benzylcarbonyl, phenoxyacetyl or substituted phenoxyacetyl, wherein each substituent of substituted benzoyl, substituted benzylcarbonyl and substituted phenoxyacetyl is attached to the phenyl ring and is independently fluoro, chloro, bromo, lower alkyl, lower alkoxy or nitro, $R_2$ is lower alkyl or lower alkoxy, X is chloro or bromo, and each Alk is straight or branched alkylene having 1, 2, 3 or 4 carbon atoms.

2. A compound according to Claim 1 wherein each substituted benzoyl, substituted benzylcarbonyl and substituted phenoxyacetyl is monosubstituted.

3. A compound according to Claim 2 wherein each Alk is

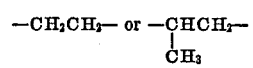

4. A compound according to Claim 1 wherein each $R_1$ is benzylcarbonyl, substituted benzylcarbonyl, phenoxyacetyl or substituted phenoxyacetyl.

5. A compound according to Claim 4 wherein each substituent of substituted benzylcarbonyl and substituted phenoxyacetyl is independently fluoro, chloro, lower alkyl, lower alkoxy or nitro.

6. A compound according to Claim 1 wherein each $R_1$ is phenoxyacetyl or substituted phenoxyacetyl.

7. A compound according to Claim 6 wherein substituted phenoxyacetyl is monosubstituted and the substituent of substituted phenoxyacetyl is fluoro or lower alkyl.

8. The compound according to claim 3 having the formula

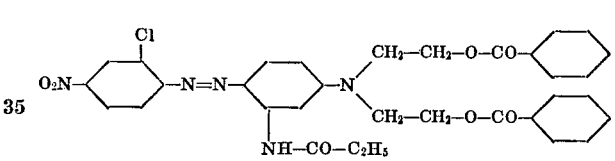

9. The compound according to claim 3 having the formula

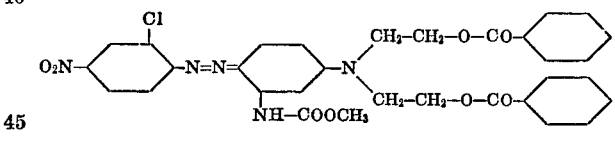

10. The compound according to claim 5 having the formula

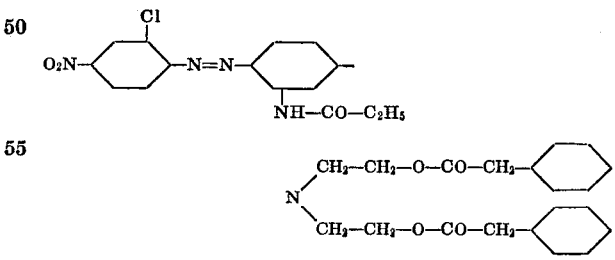

11. The compound according to claim 5 having the formula

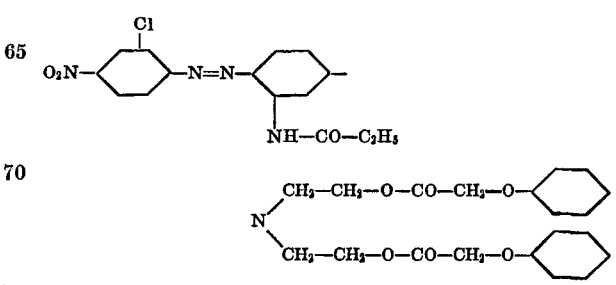

12. The compound according to claim 5 having the formula
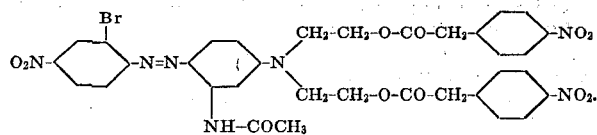
References Cited
UNITED STATES PATENTS
3,520,871   7/1970   Zanella _____ 260—207
3,097,198   7/1963   Fishwick et al. _____ 260—207.1
FOREIGN PATENTS
852,396   9/1958   Great Britain _____ 260—207.1
1,058,378   2/1967   Great Britain _____ 260—207.1
LORRAINE A. WEINBERGER, Primary Examiner
C. F. WARREN, Assistant Examiner
U.S. Cl. X.R.
8—41 C; 260—473 R, 473 G, 477, 472